April 22, 1930.　　　　E. LIPSON　　　　1,755,609
TESTING VACUUM TUBES
Filed July 30, 1925
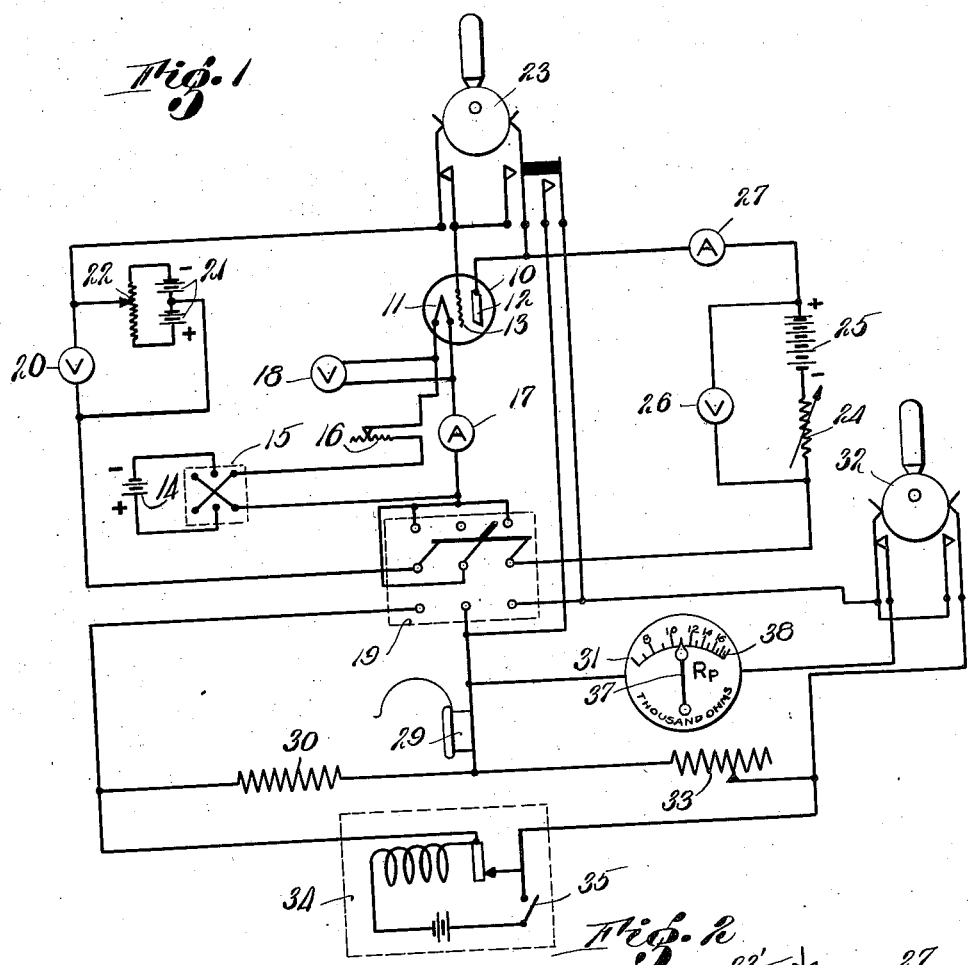
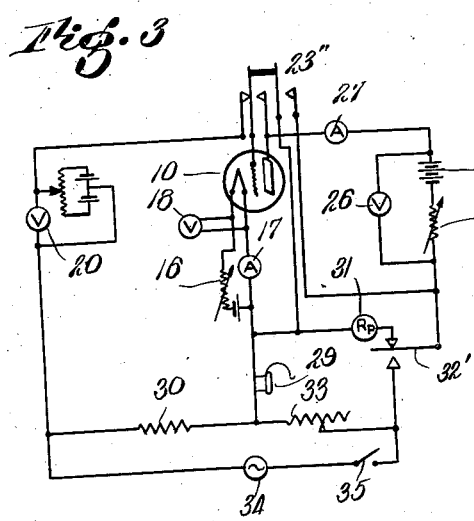

Patented Apr. 22, 1930

1,755,609

UNITED STATES PATENT OFFICE

EDWARD LIPSON, OF CHELSEA, MASSACHUSETTS

TESTING VACUUM TUBES

Application filed July 30, 1925. Serial No. 47,087.

This invention relates to methods of and means for determining the operational constants and characteristics of space current devices and particularly relays of the space current type.

In testing relays and similar devices of the space current type it is usually important to make one or more of the following determinations: the input voltage, output voltage and output current at one or more points on the characteristic curves; the cathode heating current and voltage; the total emission of electrons from the cathode; the amplification factor which is the ratio of an alternating current output voltage to the corresponding alternating input voltage giving rise to said output voltage; the output resistance to direct current which, for any one value of direct current, is equal to the ratio of the direct current voltage to the current; the internal impedance to alternating current which, at a given temperature of the cathode, is the slope of the output voltage-current characteristic curve in which voltages of the output circuit are plotted as ordinates against output currents as abscissæ; and the mutual conductance which is the ratio of the amplification factor to the output impedance. It is to be noted that the amplification factor characteristic, the internal impedance characteristic and the mutual conductance characteristic are all alternating current characteristics which ordinarily require the use of an alternating current for their measurement. The alternating current or dynamic characteristics are, for most practical purposes, of more interest than the static characteristics of a space current device.

These determinations require considerable apparatus and involve complicated operations when ordinary present day equipment is employed. Measurements of the internal impedance and the mutual conductance of space current devices require particularly complicated apparatus and operations. Even the simpler forms of apparatus for this purpose require the adjustment of balancing circuits and an undesirably lengthy process of approximate balances before a single accurate determination can be made.

In view of the present extensive manufacture of vacuum tubes for radio and other purposes and the necessity of testing large numbers of these devices in certain kinds of work, it is of considerable importance to simplify the equipment required to carry out the desired tests and it is particularly important to minimize the time and difficulty of making these tests.

Objects of the present invention are: to overcome the above difficulties and to satisfy the above desired conditions; to provide simple and compact apparatus of relatively low cost, capable of efficiently making all of the above mentioned determinations; to provide a new method of and means for rapidly measuring the internal impedance of a relay of the space current type; and generally to improve testing apparatus for devices of the kind referred to.

According to one aspect of the present invention, a testing circuit is provided for determining the operational constants and characteristics of space current devices. Switching arrangements are provided for rapidly modifying the circuit to adapt it for the various tests. A simple form of equipment is provided for producing an indication directly in terms of the internal impedance of the space current device without the necessity of manipulating any balancing circuits and without the necessity of employing alternating current for producing the indication.

These, and other features and objects are referred to in more detail in the following description in connection with the accompanying drawing, in which:

Fig. 1 is a diagram of a testing circuit;

Fig. 2 is a schematic diagram showing the equivalent circuit when only the upper part of the circuit of Fig. 1 is being used; and Fig. 3 is a schematic diagram showing the equivalent circuit when the lower part of Fig. 1 is employed.

Referring to Fig. 1, the relay device or vacuum tube 10, of the space current type, contains the filamentary cathode 11, anode 12, and grid or control element 13, any well-known suitable means (not shown) being provided for quickly making or breaking connections between the device 10 under test and the testing circuit. The battery 14, or other source of direct current supplies heating current to filament 11, by way of reversing switch 15. The rheostat 16 permits of adjusting the heating current to the desired value as indicated by the ammeter 17, or the voltage to the desired value as indicated by voltmeter 18.

When the three-pole, double throw switch 19 is in its upper position, the input circuit of device 10 may be traced from cathode 11, left hand blade of switch 19, voltmeter 20, which indicates the voltage impressed on the input circuit from battery 21 by way of the adjustable potentiometer 22, left hand main spring of switch 23, back contact for said spring, to grid 13. The output circuit may be traced from cathode 11, right hand blade of switch 19, variable resistance 24 and source of space current 25 in parallel with voltmeter 26, ammeter 27, to anode 12. Variable resistance 24 permits of varying the voltage impressed on the output circuit as indicated by voltmeter 26. It will be seen that only the upper part of the circuit Fig. 1 is in use when switch 19 is in its upper position. Fig. 2 shows the equivalent circuit when switch 19 is in this position.

When the lever of switch 23, Fig. 1, is in the position shown, grid 13 remains connected to the input circuit, and when the lever is thrown to the right in Fig. 1, the left hand main spring breaks its back contact, while the right hand main spring connected with anode 12 engages with its forward contact leading to grid 13. It will be seen that the above operations are accomplished by switch 23', Fig. 2, by movement of the main spring of the switch to the right.

Fig. 3 shows the equivalent circuit of Fig. 1 when switch 19 is in its lower position. The input circuit may be traced from cathode 11, central blade of switch 19, telephone receiver 29, or other indicating device of negligibly low impedance in the input circuit, resistance 30, left hand blade of switch 19, voltmeter 20, left hand main spring of switch 23, to grid 13. The output circuit extends from cathode 11, through the central blade of switch 19, indicator 31, left hand pair of contacts of switch 32, right hand blade of switch 19, battery 25, to anode 12. Indicator 31 is a current responsive device operating on the principle of an ammeter to indicate quantitatively, and is preferably of negligible or low impedance as compared with the circuit in which it is connected.

When the lever of switch 32 is moved to the right of the position shown, the normally open right hand pair of contacts are closed and the normally closed left hand pair of contacts are opened, thereby disconnecting indicator 31 from the output circuit and substituting therefor the variable resistance 33.

The left hand terminal of resistance 30 is connected to one of the output terminals of buzzer 34 or other suitable source of alternating current of a frequency suitable to be detected by indicator 29. The other output terminal of the buzzer is connected to the right hand terminal of resistance 33, the buzzer 34 being made effective to supply alternating current when switch 35 is closed.

When the lever of switch 23, Fig. 1, or the main spring of switch 23", Fig. 3, is thrown to the right, the right hand pair of contacts are closed to short-circuit the indicator 31 or the receiver 29 and resistance 33, depending upon whether the lever of switch 32 or of switch 32' is in its normal position.

Characteristic curve

Voltmeter 20 indicates the polarizing voltage applied to the input circuit, the voltage of the grid being adjustable to any desired value between an extreme negative and an extreme positive limit by adjusting potentiometer 22.

The output voltage, adjusted by rheostat 24, is indicated by voltmeter 26, while the corresponding current is indicated by ammeter 27. By making different adjustments of resistance 24 while switch 19 is in its upper position and switches 23 and 32 are in their normal positions as shown in Fig. 1, the circuit being that shown in Fig. 2, and observing the corresponding indications of voltmeter 26 and ammeter 27, the static output voltage-current characteristic curve of the device 10 may be obtained. Other desired characteristic curves may be obtained by plotting observations against predetermined values of any desired variable.

Resistance to direct current

The resistance to direct current is determined by the ratio of the output voltage to the output current, the switches being in the same position as when determining the characteristic curve. The resistance may be measured at any desired input voltage, one measurement usually being made when the input voltage is adjusted to zero.

Internal impedance

The internal impedance between electrodes 11 and 12 is measured by placing switch 19 in its lower position to produce the circuit shown in Fig. 3, switches 23 and 32 being in their normal positions as shown in Fig. 1. It will be noted that when switch 32', Fig. 3, corresponding with switch 32, Fig. 1, is connected in the position shown, the indicator 31 is connected in series with the output circuit. In the example shown to illustrate the invention, the indicator 31 is a deflecting instrument, quantitatively responsive to the direct current transmitted therethrough, and having suitable sensitivity to provide the desired deflection. The pointer 37 of the instrument is normally restored to an extreme right hand position when no current passes through the instrument, being deflected toward the left in response to current; although the instrument may be of the type which deflects toward the right from a normal left hand position, the scale divisions and their numberings in this case being arranged in reverse order from that shown. In the drawing, the instrument is shown deflected as though current were passing therethrough.

The scale of the instrument is so calibrated that the pointer indicates directly in response to direct current transmitted through the instrument, the internal alternating current impedance of the device 10 without requiring any computation, or the use of alternating current in the ordinary sense, or the use of balancing circuits, it being merely necessary to maintain the output voltage at a predetermined constant value for any one measurement as indicated by voltmeter 26, the input voltage being ordinarily adjusted to zero, or to some other predetermined value if desired, and the cathode temperature being adjusted to the desired value by adjusting the heating current or voltage to a predetermined value so that the device 10 is subjected to a predetermined energization.

The indicator 31 may be calibrated or checked by first placing switch 19 in its upper position and determining the output voltage-current characteristic curves for various values of filament current or voltage, and measuring the slopes of these curves to determine the output impedance of device 10 corresponding to particular values of filament current or voltage. Switch 19 is then placed in its lower position, the current or voltage of the filament then being adjusted to the various values previously referred to and the corresponding deflections of indicator 31 noted. The impedance corresponding to any given deflection is marked upon the scale of the instrument so that the instrument will then indicate the known values obtained from the characteristic curves. Indicator 31 may now be employed to test the output impedance of other space current devices having substantially equivalent construction or constants. It will be noted that the divisions of scale 38 are larger in that part of the scale corresponding with greater deflections of pointer 37 and are smaller for smaller deflections corresponding with readings of higher impedance.

Amplification constant

Switch 19 is placed in its lower position for measuring the amplification constant, the circuit being that shown in Fig. 3. Switch 32, Fig. 1, corresponding to switch 32', Fig. 3, is thrown to its alternate position, thus removing indicator 31 from the circuit and substituting therefor receiver 29 and variable resistance 33. The source of alternating current 34 is then made effective by closing switch 35, resistance 33 being adjusted until a minimum sound is produced in receiver 29. The amplification constant $\mu$ is then expressed by the following equation:

$$\mu = \frac{R_2}{R_1}$$

in which $R_1$ and $R_2$ are the resistances 30 and 33, respectively. By selecting a suitable value for resistance 30, such as ten ohms, for example, the resistance 33 may be calibrated to read directly the amplification factor, that is, the resistance is calibrated to read one-tenth of its true value. This circuit is described in a book entitled "Principles of Radio Communication," published by Morecroft in New York city, 1921, beginning at page 417.

Mutual conductance

The mutual conductance $\frac{\mu}{R_p}$, may be calculated from the observed values of the amplification factor $\mu$ and the internal impedance $R_p$, or may be read directly from a table showing values of the conductance calculated for various values of $\mu$ and $R_p$.

Total electron emission

The total electron emission may be measured for a given filament temperature by throwing to the right the lever of switch 23, Fig. 1, switch 23', Fig. 2, or switch 23'', Fig. 3. This operation transfers the grid from the input circuit and connects it with the anode 12. In order to eliminate the resistance of indicator 31 or receiver 29 and resistance 33 from the circuit when the electron emission is being measured, the right hand pair of contacts of switches 23 and 23'' are closed while the emission is being measured to short-circuit the indicator or the receiver circuit, depending on the position of switch 32 or 32'. The total emission is indicated by ammeter 27, rheostat 16 being adjusted to provide the desired indication on voltmeter 18 or ammeter 17 corresponding to the desired temperature of the cathode.

The above described circuit arrangements enable one to determine all of the usually desired constants and characteristics of a space current device. The apparatus is simple and compact, requiring a minimum number of elements in order to perform the desired operation. Owing to the use of a direct indicating instrument for measuring the internal impedance of the space current device, balancing resistances for this measurement are eliminated and considerable time is saved in making the measurement. Furthermore, it is to be noted that the internal impedance, an alternating current characteristic, is directly indicated in response to direct current without the necessity of employing alternating current. The apparatus provides convenient means for readily checking the indication of the instrument for measuring the internal impedance, thus making it possible to re-calibrate the instrument so that it may be employed for measuring relays designed in such a manner that the original calibration of the instrument does not apply thereto with the desired accuracy.

I claim:

1. In a testing circuit for relays of the space current type, means for supplying direct current to a relay to be tested, and means responsive to direct current from said means in a part of said circuit for producing an indication directly of a value corresponding to an alternating current characteristic of the relay.

2. In a testing circuit for relays of the space current type, connections including an input circuit and an output circuit for a relay to be tested, means for supplying direct current to the relay, and means responsive to direct current in said output circuit for producing an indication directly of a value corresponding to the internal alternating current impedance of the relay.

3. In a testing circuit for relays of the space current type, connections including an input circuit and an output circuit for a relay to be tested, means for supplying direct current to the relay, and an ammeter responsive to direct current in said output circuit having a scale calibrated in values corresponding to the internal alternating current impedance of the relay.

4. In a testing circuit for relays of the space current type, connections including an input circuit and an output circuit for said relay, means for supplying current to said relay, means responsive to current transmitted through said output circuit for producing an indication in terms of the internal impedance of the relay, and other means associated with said output circuit for determining the calibration of said indicating means.

5. In a testing circuit, a space current device having a cathode, an anode and a control element, an input circuit connected between said cathode and control element and an output circuit connected between said cathode and anode, means for supplying current to said device, means for transferring said control element from connection with said imput circuit to connection with said output circuit for measuring the total electron emission from said cathode, and means cooperating with said transfer means for short-circuiting a portion of said output circuit while measuring the total emission.

6. The method of measuring the internal alternating current impedance between a pair of electrodes of a space current device, which comprises applying a predetermined direct current voltage to said electrodes and causing the resulting direct current to produce an indication of a value corresponding to the alternating current impedance being measured.

7. The method of measuring the internal alternating current impedance of a relay of the space current type, which comprises subjecting the relay to a predetermined energization, transmitting the space current through a direct current responsive indicator calibrated to read values corresponding to alternating current impedances, and reading the resulting indication.

8. The method of measuring an alternating current characteristic of a space current path, which comprises passing direct current over said path, and producing a quantitative indication of said direct current of a value corresponding to the alternating current characteristic of said path.

9. The method of calibrating the scale of an indicator for direct current, which method comprises measuring the alternating current impedance of a space current path for a given space current, transmitting said given space current through said indicator, and marking said scale so that the indication of the instrument displays directly without further calculation a value corresponding to said impedance.

10. In a direct current indicating instrument, a moving indicator element responsive to direct current and a stationary indicator element, one of said elements having a scale, the divisions of which are calibrated directly in terms of an alternating current characteristic of predetermined space current devices, said other element having a pointer adapted to cooperate with said scale in response to direct current transmitted through said instrument for correctly indicating a value corresponding to the alternating current characteristic of a given space current device.

11. In a testing circuit for relays of the space current type, a meter for indicating a predetermined energization of a given relay, and a direct current indicator, said indicator being so calibrated as to indicate to the observer in response to direct current, a value corresponding to an alternating current characteristic of the given relay for the predetermined energization indicated by said meter, the face of said indicator being provided with indicia for indicating without further reference a value corresponding to the alternating current characteristic of the given relay.

In witness whereof I hereunto subscribe my name this 27th day of July, 1925.

EDWARD LIPSON.